(12) United States Patent
Masuya

(10) Patent No.: US 10,427,262 B2
(45) Date of Patent: Oct. 1, 2019

(54) MACHINE TOOL WITH ROTARY TABLE WITH SUPPRESSED DIVERGENCE BETWEEN ESTIMATE BRAKE LIFTTIME AND ACTUAL BRAKE LIFETIME

(71) Applicant: FANUC Corporation, Yamanashi (JP)

(72) Inventor: Michi Masuya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 330 days.

(21) Appl. No.: 14/796,651

(22) Filed: Jul. 10, 2015

(65) Prior Publication Data
US 2016/0008939 A1    Jan. 14, 2016

(30) Foreign Application Priority Data
Jul. 11, 2014    (JP) ................................. 2014-143437

(51) Int. Cl.
    *B23Q 11/00*    (2006.01)
(52) U.S. Cl.
    CPC .... *B23Q 11/0092* (2013.01); *B23Q 2220/004* (2013.01)
(58) Field of Classification Search
    CPC ...................... B23Q 11/0092; B23Q 2220/004
    See application file for complete search history.

(56) References Cited

U.S. PATENT DOCUMENTS 3,814,216 A * 6/1974 Pisatowski ................ B66B 5/06
                                                      187/293
4,790,606 A * 12/1988 Reinecke .................. B60T 8/00
                                                      188/1.11 E
(Continued)

FOREIGN PATENT DOCUMENTS

JP    H05-281097 A    10/1993
JP    9-71239 A        3/1997
(Continued)

OTHER PUBLICATIONS

Oxford dictionaries. [online]. Oxford University press, [retrieved on Mar. 26, 2018]. Retrieved from internet: <URL: https://en.oxforddictionaries.com/definition/accumulate> (Year: 2018).*
(Continued)

*Primary Examiner* — Robert E Fennema
*Assistant Examiner* — Marzia T Monty
(74) *Attorney, Agent, or Firm* — Hauptman Ham, LLP

(57) ABSTRACT

A machine tool includes a rotary table to which a workpiece is mounted, a brake, a displays, a memory configured to store a table in which values of a first coefficient correspond to different sizes of a disturbance torque, and values of a second coefficient correspond to different sizes of inertia of the workpiece. The controller is configured to calculate a size of the disturbance torque, find a first coefficient corresponding to the calculated size of the disturbance torque and the table, find a second coefficient corresponding to the size of the inertia of the workpiece and the table, accumulate the found values of the first and second coefficients, and cause the display to generate an indicator of necessity of a replacement of the brake in response to that the accumulated values of the first and second coefficients reaches a predetermined value.

3 Claims, 3 Drawing Sheets

(56) References Cited

U.S. PATENT DOCUMENTS

| | | | | |
|---|---|---|---|---|
| 5,941,359 A | * | 8/1999 | Naito | G05B 19/238 |
| | | | | 192/146 |
| 6,241,324 B1 | * | 6/2001 | Miyazaki | B60T 8/172 |
| | | | | 303/148 |
| 7,110,689 B2 | * | 9/2006 | Takahashi | G03G 15/2028 |
| | | | | 399/21 |
| 2004/0011596 A1 | * | 1/2004 | Miller | B60T 17/22 |
| | | | | 188/1.11 W |
| 2007/0168085 A1 | * | 7/2007 | Guilford | G05B 13/024 |
| | | | | 700/280 |
| 2011/0142594 A1 | * | 6/2011 | Dinjus | F03D 7/0224 |
| | | | | 415/4.3 |
| 2012/0154177 A1 | * | 6/2012 | Wingate | B60T 17/22 |
| | | | | 340/945 |
| 2014/0035213 A1 | * | 2/2014 | Zheng | B23Q 1/25 |
| | | | | 269/57 |

FOREIGN PATENT DOCUMENTS

| | | |
|---|---|---|
| JP | 2002-303344 A | 10/2002 |
| JP | 2004-051266 A | 2/2004 |
| JP | 2012-202484 A | 10/2012 |
| JP | 2014-30864 A | 2/2014 |
| JP | 2014-48774 A | 3/2014 |

OTHER PUBLICATIONS

Office Action in JP Application No. 2014-143437, dated Feb. 14, 2017.

* cited by examiner

EXAMPLE OF COEFFICIENT K1

| DISTURBANCE TORQUE SIZE | COEFFICIENT K1 |
|---|---|
| SMALL | 1.0 |
| MEDIUM | 2.0 |
| LARGE | 3.0 |

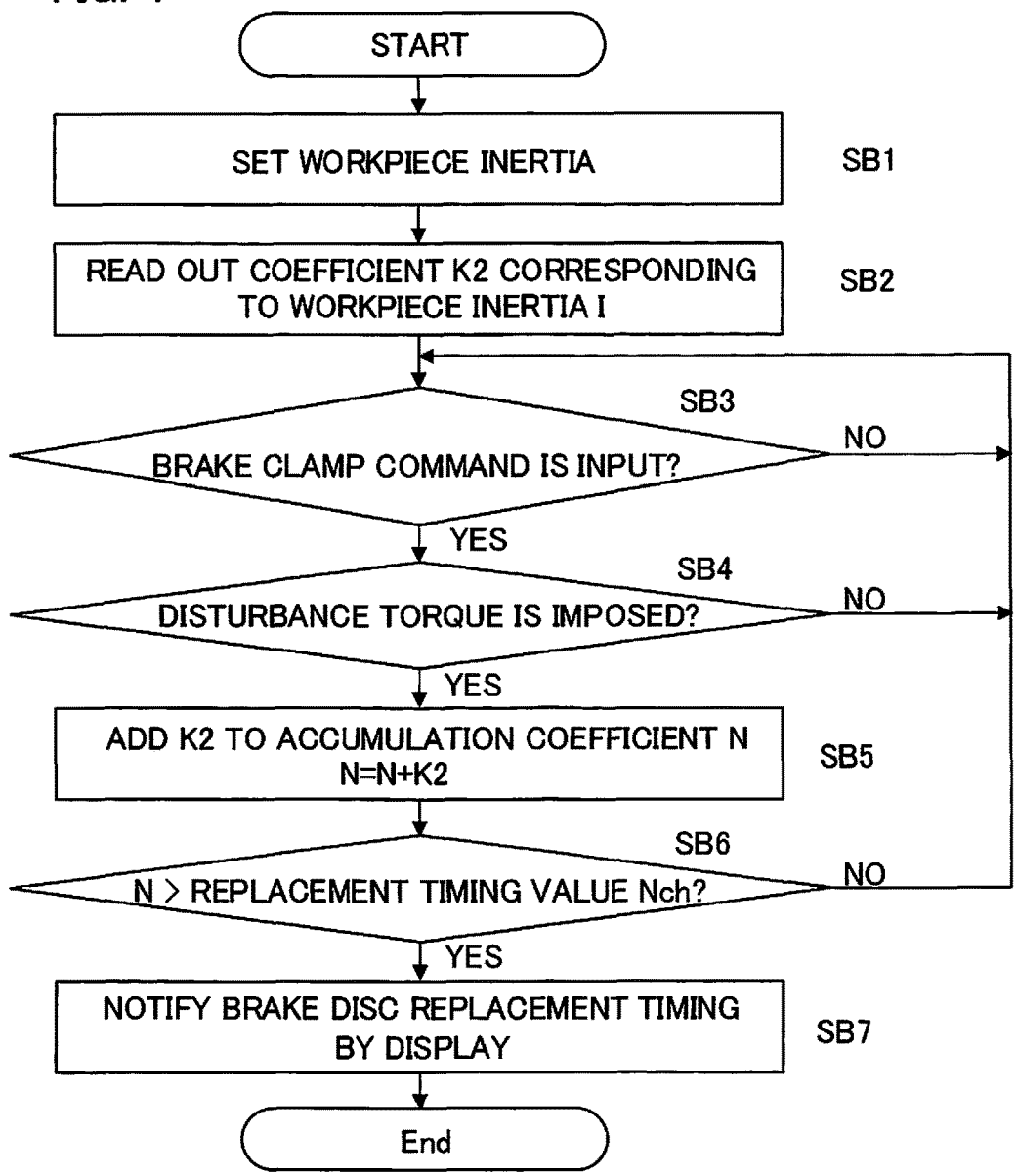

MACHINE TOOL WITH ROTARY TABLE WITH SUPPRESSED DIVERGENCE BETWEEN ESTIMATE BRAKE LIFTTIME AND ACTUAL BRAKE LIFETIME

RELATED APPLICATIONS the present application claims priority to Japanese Application Number 2014-143437, filed Jul 11, 2014, the disclosure of which is hereby incorporated by reference herein in its entirety.

BACKGROUND OF THE INVENTION

1. Field of the Invention

The present invention relates to a machine tool having a rotary table.

2. Description of the Related Art

In general, it is necessary for machineries with motion to have a brake to stop the motion. This is also the case for a machine tool, and the machine tool provided with a rotary table has a brake to index the rotary table at an indexed position by servo motor and firmly hold the rotary table at the position. This brake generally has a brake disc to operate brake action by pressing or the like of the brake disc.

In the brake with this configuration, frictional wear of a brake disc is caused by disturbance torque by machining load at the brake holding and so on, as brake operation is repeated. The brake disc has a life time, because efficient brake operation becomes difficult as the frictional wear progresses.

As for the machinery with a brake, such techniques are disclosed as disclosed in the patent literatures below.

Japanese patent Laid-Open No. 2012-202484 discloses a technique of break configuration with a brake disc of a rotary table, using the brake disc for clamping and unclamping.

In a technique disclosed in Japanese Patent Laid-Open No. 2004-51266, a brake operation number of a hoisting machine is used as an actual operation number in an elevator as a machine by comparing a number of brake operation times of the hoisting machine with a pre-set value, and a maintenance check operator is acknowledged of exceeding the pre-set value when it is the case.

Japanese Patent Laid-Open No. 2002-303344 discloses a technique of, detecting a predetermined amount of abrasion of a brake parts lining having reached a pre-set value by counting a brake pedal stepping-in, and displaying the same on a screen, in a vehicle brake.

Japanese Patent Laid-Open No. 5-281097 discloses a brake pad lifetime estimation technique determining a number of times of break operation reaches a predetermined value based on vehicle speed, deceleration, and a brake operation number.

The technique in Japanese Patent Laid-Open No. 2012-202484 discloses a brake disc on a rotary table, but do not consider lifetime estimation of the brake disc.

The techniques disclosed in Japanese Patent Laid-Open No. 2004-51266 and No. 2002-303344 estimate a brake disc lifetime by counting brake operation, however divergence is likely to occur between the brake lifetime estimated only by counting brake operation and an actual brake lifetime, since strength of brake disc holding force in the brake operation varies.

The technique disclosed in Japanese Patent Laid-Open No. 5-281097 considers vehicle speed and deceleration in addition to number of times of brake operation, however it is likely to be difficult to estimate the brake lifetime with precision when the vehicle speed or deceleration varies widely, since only such a correction is performed that, lifetime data of a brake pad in the technique is decreased when brake operation at vehicle velocity equal to or more than predetermined value is performed for predetermined number of times, or when deceleration is equal to or more than a predetermined value.

SUMMARY OF THE INVENTION

Therefore, the object of the invention is to provide a machine tool with suppressed divergence between estimated brake lifetime and actual brake lifetime, in which more precise preliminary maintenance of a brake disc is possible than in the prior arts, so as to prevent a machining error.

A machine tool with a rotary table according to the invention is configured to index a rotary table with a workpiece mounted thereupon and retain an indexed position by a brake. The machine tool with a rotary table includes a disturbance torque calculation unit configured to calculate a disturbance torque imposed on the brake while the rotary table is retained by the brake, a first coefficient storing unit configured to store a first coefficient corresponding to the disturbance torque, an accumulation unit configured to, when the disturbance torque is imposed on the brake, calculate a disturbance torque using the disturbance torque calculation unit, find a first coefficient corresponding to the disturbance torque based on the disturbance torque calculated and referring to the first coefficient storing unit, and accumulate a value of the first coefficient, and an annunciation unit configured to annunciate necessity of a brake replacement when the value of the first coefficient accumulated reaches a predetermined value.

When a disturbance torque is imposed on the brake, the imposed disturbance torque size is calculated and necessity of a brake replacement is annunciated by finding a first coefficient based on the disturbance torque size and accumulating the first coefficient. Thus, more precise break lifetime estimation is possible in the invention than in the prior arts, since the brake replacement is determined not only by counting break operation times but also by considering disturbance torque size while the rotary table is retained.

A machine tool with a rotary table according to the invention is configured to index a rotary table with a workpiece mounted thereupon and retain an indexed position by a brake. The machine tool with the rotary table includes an inertia storing unit configured to preliminary store an inertia of the rotary table corresponding to the workpiece, a second coefficient storing unit configured to store a second coefficient corresponding to size of the inertia, an accumulation unit configured to, when the disturbance torque is imposed on the brake, find a second coefficient corresponding to the inertia based on the inertia stored and referring to the second coefficient storing unit, and accumulate a value of the second coefficient, and an annunciation unit configured to annunciate necessity of a brake replacement when an accumulated value of the coefficient reaches a predetermined value.

When a disturbance torque is imposed on the brake, necessity of a brake replacement is annunciated by finding a second coefficient corresponding to inertia size and accumulating the second coefficient. Thus, more precise break lifetime estimation is possible in the invention than in the prior arts, since the brake replacement is determined not only by counting break operation but also by considering inertia size.

A machine tool with a rotary table according to the invention is configured to index a rotary table with a workpiece mounted thereupon and retain an indexed position by a brake. The machine tool with the rotary table includes a disturbance torque calculation unit configured to calculate a disturbance torque imposed on the brake while the rotary table is retained by the brake, an inertia storing unit configured to preliminary store an inertia of the rotary table corresponding to the workpiece, a first coefficient storing unit configured to store a first coefficient corresponding to the disturbance torque, a second coefficient storing unit configured to store a second coefficient corresponding to size of the inertia, an accumulation unit configured to, when the disturbance torque is imposed on the brake, calculate a disturbance torque using the disturbance torque calculation unit, find a first coefficient corresponding to the disturbance torque based on the disturbance torque calculated and referring to the first coefficient storing unit, find a second coefficient corresponding to the inertia based on the inertia stored and referring to the second coefficient storing unit, and accumulate a value of the first coefficient and a value of the second coefficient, and an annunciation unit configured to annunciate necessity of a brake replacement when the value of the first coefficient accumulated reaches a predetermined value.

When a disturbance torque is imposed on the brake, the imposed disturbance torque size is calculated and necessity of a brake replacement is annunciated by finding a first coefficient based on the disturbance torque size, finding a second coefficient corresponding to inertia size, and accumulating the coefficients. Thus, more precise break lifetime estimation is possible in the invention than in the prior arts, since the brake replacement is determined not only by counting break operation but also by considering disturbance torque size and inertia size.

By configuring the present invention as described above, a machine tool can be provided, with suppressed divergence between the estimated brake lifetime and actual brake lifetime. In addition, more precise preliminary maintenance of a brake disc is possible in the machine tool of the present invention than in the prior arts, so as to prevent a machining error.

BRIEF DESCRIPTION OF THE DRAWINGS

The above-described object, the other object, and the feature of the invention will be proved from the description of embodiments below with reference to the accompanying drawings. In these drawings:

FIG. 4 is a flowchart illustrating an operational flow of the second embodiment of the invention; and FIG. 5 is a figure showing an example of a coefficient corresponding to a workpiece inertia size I of the second embodiment of the invention.

DETAILED DESCRIPTION OF THE PREFERRED EMBODIMENTS

Figure 1:
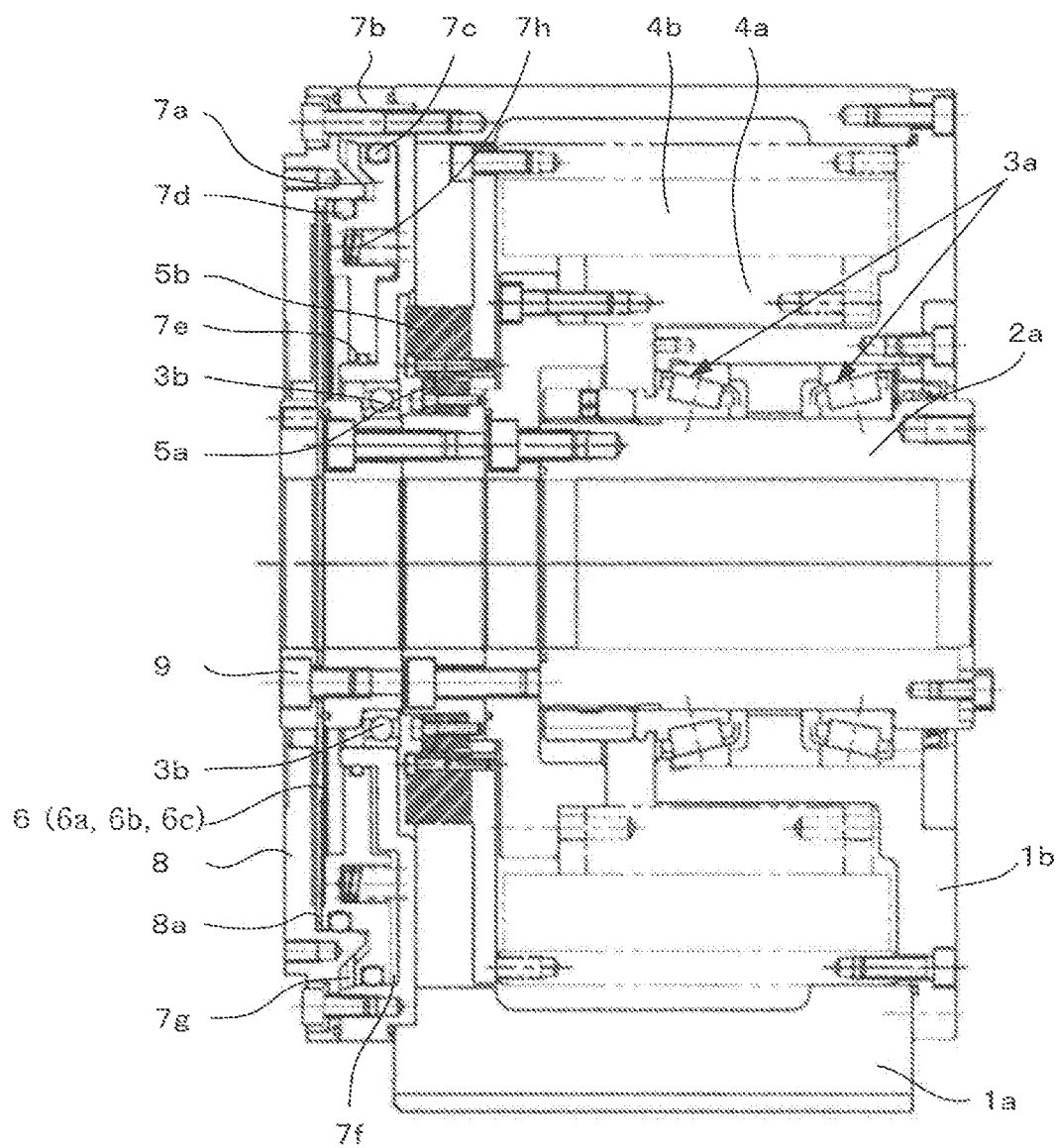
FIG. 1 is a cross-sectional view of the rotary table with direct drive configuration, cut in a plane including the center line of the rotary table.

FIG. 1 is a cross-sectional view of a rotary table with direct drive configuration, cut in a plane including a center line of the rotary table. A rotary table, not shown in the figure, is attached on a right end face of a shaft 2a in the figure using a bolt or the like. There is a case where a workpiece is directly attached to the right end face of a shaft 2a in the figure directly, without using the rotary table. The shaft 2a of the rotary table is rotatably supported in a casing 1a via a housing 1b using a main bearing 3a and a support bearing 3b. The shaft 2a has such a configuration that a plurality of components are connected by volts or the like. A stator 4b of a motor, a cylinder 7b of a brake, a sensor head 5b, and a lid 8 are secured to a casing 1a, and a rotor 4a, a sensor gear (a position detector) 5a, and a brake disc 6 are secured to the shaft 2a using volts or the like, so as to be integrally rotatable with a rotary table, not shown in the figure. Thus, the rotor 4a and the stator 4b compose a motor rotated with a rotary table, not shown in the figure, driven directly. As the shaft 2a rotates, the sensor gear 5a rotates. A sensor head 5b detects the rotation of the sensor gear 5a, and outputs a pulse signal which corresponds to the rotation amount to a controller of a machine tool not shown in the figures or the like.

A piston 7a with forward and backward stroke in a cylinder 7b is installed via sealing members 7c to 7e. The piston 7a is biased in the direction moving to clamping side by a coil spring 7h, while a forward movement air room 7f and a backward movement air room 7g are installed between the lid 8 and the piston 7a/the cylinder, to make it possible for the piston 7a to be moved by compressed air.

In unclamping state (clamping release state), compressed air is sent to the backward movement air room 7g by an electromagnetic valve, not shown in FIG. 1, and the piston 7a is in a state of being moved to the backward end position against stretching force of the coil spring 7h.

In clamping state, air in the backward movement air room is released while compressed air is sent to the forward movement air room by the electromagnetic valve, so that the piston 7a advances to sandwich the brake disc 6 with a friction plane 8a on the lid 8. Members of 6a, 6b, or 6c described below is used as a brake disc 6. Here, reference number "9" designates a volt.

<The First Embodiment>

Figures 2, 3:
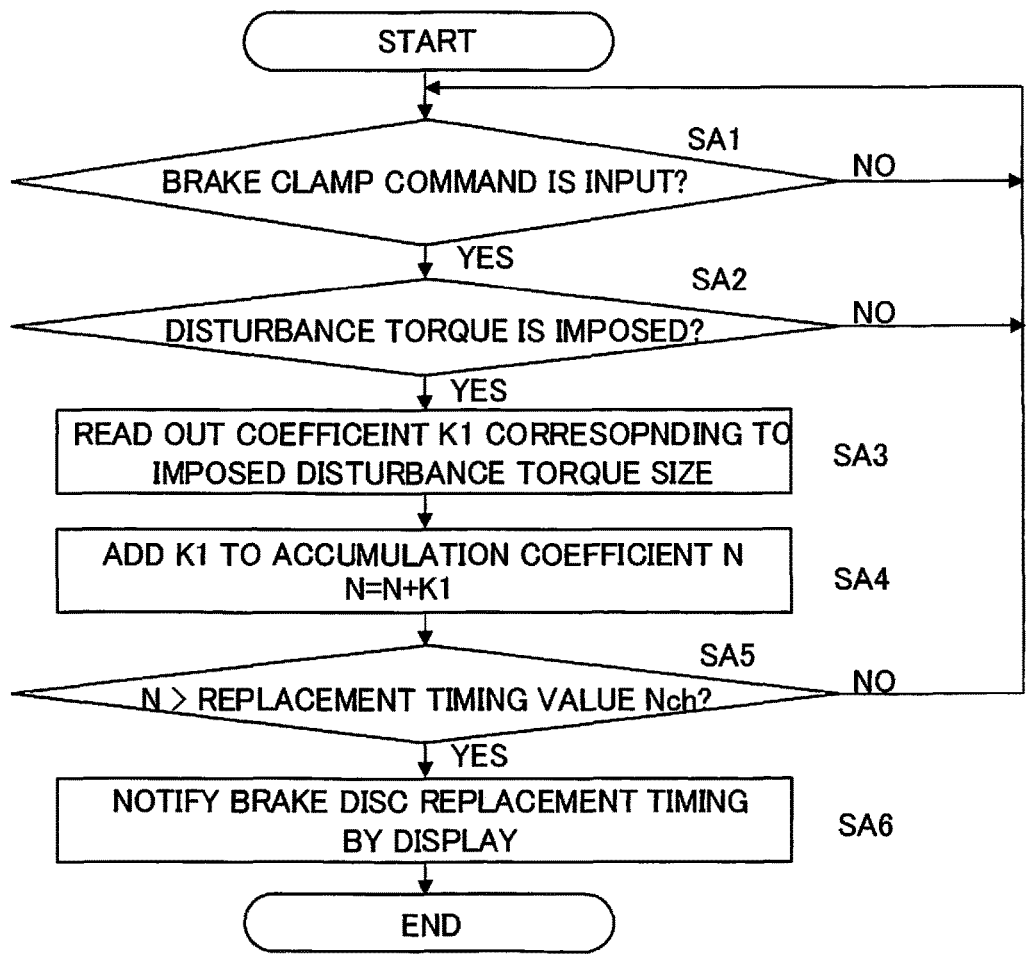
FIG. 2 is a flowchart illustrating an operational flow of the first embodiment of the invention.
FIG. 3 is a figure showing an example of a coefficient corresponding to disturbance torque size of the first embodiment of the invention.

Brake disc lifetime determination method in this rotary table is explained below. FIG. 2 is a flowchart illustrating an operational flow of the present embodiment. Each step is explained below.

(Step SA1) Whether a brake clamp command is input or not is determined. The processing advances to Step SA2 when the command is input (YES), and the processing repeats Step SA1 waiting an input of the command when the command is not input (NO).

(Step SA2) Whether a disturbance torque is imposed or not is determined. The processing advances to SA3 when the disturbance torque is imposed (YES), and the processing returns to SA1 when the disturbance torque is not imposed (NO).

(Step SA3) Coefficient K1 corresponding to imposed disturbance torque size is read out.

(Step SA4) K1 value is added to accumulation coefficient N.

(Step SA5) Whether accumulation coefficient N exceeds a predetermined Nch value indicating a replacement timing or not is determined. The processing advances to Step SA 6 if the accumulation coefficient N exceeds the value (YES), and the processing returns to Step SA1 if the accumulation coefficient does not N does not exceed the value (NO).

(Step SA6) The replacement timing is notified by a display.

FIG. 3 shows an example of the coefficient corresponding to disturbance torque size. In FIG. 3, the coefficient set to be, 1.0, 2.0, and 3.0 each for small, medium, and large disturbance torque, thus corresponding to the disturbance torque size. The coefficient is changed according to the disturbance torque size in this manner so that a replacement timing comes earlier as larger disturbance torque is imposed.

<Second Embodiment>

FIG. 4 shows an example of operation in the present embodiment. Each step is explained below.

(Step SB1) A workpiece inertia I is set.

(Step SB2) A coefficient corresponding to the workpiece inertia I is read out.

(Step SB3) Whether a brake clamp command is input or not is determined. The processing advances to Step SB4 when the command is input (YES), and the processing repeats Step SB3 waiting an input of the command when the command is not input (NO).

(Step SB4) Whether a disturbance torque is imposed or not is determined. The processing advances to SB5 when the disturbance torque is imposed (YES), and the processing returns to SB3 when the disturbance torque is not imposed (NO).

(Step SB5) K2 value is added to an accumulation coefficient N.

(Step SB6) Whether the accumulation coefficient N exceeds a predetermined Nch value as a replacement timing or not is determined. The processing advances to Step SB 7 if the accumulation coefficient N exceeds the value (YES), and the processing returns to Step SB 3 if the accumulation coefficient does not N does not exceed the value (NO).

(Step SB7) The brake disc replacement timing is notified by a display.

FIG. 5 shows an example of the coefficient corresponding to disturbance torque size I. In FIG. 5, the coefficient set to be, 0.5, 1.0, and 2.0 each for small, medium and large workpiece inertia. The coefficient is changed according to the workpiece inertia I and larger coefficient is set for larger workpiece inertia I in this manner, so that a replacement timing comes earlier as workpiece inertia I is larger.

Note that the brake replacement timing is determined on the basis of an accumulated value of, a coefficient corresponding to disturbance torque size in the first embodiment and a coefficient corresponding to workpiece inertia in the second embodiment. Considering the both coefficients, both the coefficients may be accumulated and the accumulated value may be compared with a predetermined value, to determine the brake disc replacement timing. In this case, more precise brake disc lifetime estimation and early maintenance is enabled, since the both are considered.

In the present embodiments, coefficient corresponding to disturbance torque size or workpiece inertia size is accumulated. Alternatively, other calculation method such as accumulative multiplication of the coefficients may be adopted, when the coefficient is set in a different manner. In the present embodiments, the brake replacement timing is annunciated by displaying, but the timing may be annunciated by the other method of, for example, alarming or lightening.

The invention claimed is:

1. A machine tool, comprising:
a rotary table configured to mount a workpiece thereupon;
a brake configured to retain the rotary table at an indexed position;
a display;
a controller configured to calculate a disturbance torque imposed on the brake while the rotary table is retained by the brake; and
a memory configured to store a table in which a plurality of values of a first coefficient corresponds to a plurality of different sizes of the disturbance torque;
wherein
the controller is configured to, each time the disturbance torque is imposed on the brake,
   calculate a size of the disturbance torque,
   find a value of the first coefficient corresponding to the calculated size of the disturbance torque based on (i) the calculated size of the disturbance torque, and (ii) the table stored in the memory,
   accumulate the found value of the first coefficient, and
   cause the display to generate an indicator of necessity of a replacement of the brake in response to a determination that the value of the first coefficient accumulated over multiple times when the disturbance torque is imposed on the brake reaches a predetermined value.

2. A machine tool, comprising:
a rotary table configured to mount a workpiece thereupon;
a brake configured to retain the rotary table at an indexed position;
a display;
a memory configured to
   preliminarily store a table in which a plurality of values of a coefficient corresponds to a plurality of different sizes of an inertia of the rotary table corresponding to the workpiece; and
a controller configured to, each time a disturbance torque is imposed on the brake,
   set a size of the inertia of the rotary table corresponding to the workpiece,
   find a value of the coefficient corresponding to the size of the inertia based on (a) the size of the inertia and (b) the table stored in the memory,
   accumulate the found value of the coefficient, and
   cause the display to generate an indicator of necessity of a replacement of the brake in response to a determination that an accumulated value of the coefficient reaches a predetermined value.

3. A machine tool, comprising:
a rotary table configured to mount a workpiece thereupon;
a brake configured to retain the rotary table at an indexed position;
a controller configured to calculate a disturbance torque imposed on the brake while the rotary table is retained by the brake;
a display; and
a memory configured to
   preliminarily store a table in which a plurality of values of a first coefficient corresponding to a plurality of different sizes of the disturbance torque, and in which a plurality of values of a second coefficient corresponding to a plurality of different sizes of an inertia of the rotary table corresponding to the workpiece;
wherein
the controller is configured to, each time the disturbance torque is imposed on the brake,
   calculate a size of the disturbance torque,
   find a value of the first coefficient corresponding to the calculated size of the disturbance torque based on (i) the calculated size of the disturbance torque and (ii) the table stored in the memory, set a size of the inertia of the rotary table corresponding to the workpiece, find a value of the second coefficient corresponding to the inertia based on (a) the size of the inertia and (b) the table stored in the memory, accumulate the found value of the first coefficient and the found value of the second coefficient, and cause the display to generate an indicator of necessity of a replacement of the brake in response to a determination that the values of the first and second coefficients accumulated over multiple times when the disturbance torque is imposed on the brake reaches a predetermined value.

* * * * *